(12) United States Patent
Gupta et al.

(10) Patent No.: US 8,225,123 B2
(45) Date of Patent: Jul. 17, 2012

(54) METHOD AND SYSTEM FOR INTEGRATED CIRCUIT POWER SUPPLY MANAGEMENT

(75) Inventors: Sunny Gupta, Noida (IN); Kumar Abhishek, Ghaziabad (IN)

(73) Assignee: Freescale Semiconductor, Inc., Austin, TX (US)

( * ) Notice: Subject to any disclaimer, the term of this patent is extended or adjusted under 35 U.S.C. 154(b) by 240 days.

(21) Appl. No.: 12/787,402

(22) Filed: May 26, 2010

(65) Prior Publication Data
US 2011/0296221 A1 Dec. 1, 2011

(51) Int. Cl.
*G06F 1/32* (2006.01)

(52) U.S. Cl. ........ 713/324; 713/300; 713/323; 327/277; 327/534; 327/540; 327/541; 365/185.1; 365/189.09

(58) Field of Classification Search .................. 713/300, 713/323, 324; 327/277, 534, 540, 541; 365/185.1, 365/189.09
See application file for complete search history.

(56) References Cited

U.S. PATENT DOCUMENTS

| | | | |
|---|---|---|---|
| 5,805,508 A * | 9/1998 | Tobita | 365/189.09 |
| 7,060,566 B2 * | 6/2006 | Vogelsang | 438/270 |
| 7,109,782 B2 | 9/2006 | Kase | |
| 7,181,188 B2 * | 2/2007 | Vu et al. | 455/343.2 |
| 7,215,103 B1 * | 5/2007 | Wong et al. | 323/277 |
| 7,420,857 B2 * | 9/2008 | Hirota et al. | 365/189.09 |
| 7,583,535 B2 * | 9/2009 | Sekar et al. | 365/185.18 |
| 7,594,126 B2 * | 9/2009 | Yun et al. | 713/300 |
| 7,642,764 B2 | 1/2010 | Burton | |
| 7,684,262 B2 | 3/2010 | Zampaglione | |
| 2008/0197914 A1 | 8/2008 | Shimizu | |
| 2010/0052775 A1 | 3/2010 | Mizuno | |
| 2010/0060083 A1 | 3/2010 | Rolland | |

OTHER PUBLICATIONS

IBM Technical Disclosure Bulletin, vol. 41 No. 01—"Leakage Current REduction/Minimization through Substrate and/or Well Bias Control Coupled with Clock Power Management", 3 pages, Dated Jan. 1998.*

IEEE Journal of Solid-State Circuits, No. 11—"Dynamic Sleep Transistor and Body Bias for Active Leakage Power Control of Microprocessors"; 8 pages, Dated Nov. 2003.*

Christian Piguet, Christian Schuster and Jean-Luc Nagel, Leakage Reduction at Architectural Level, ICICDT06, IEEE 2006.

* cited by examiner

*Primary Examiner* — Brian Misiura
(74) *Attorney, Agent, or Firm* — Charles Bergere

(57) ABSTRACT

A method and system for power supply management in an integrated chip selectively manages the power supplied to the various circuits within the integrated circuit. The integrated circuit includes a combinational logic block, a memory block, a power supply block, and a control block. The power supply block includes multiple power regulators for generating power supply potentials of various magnitudes. The control block receives a power down signal, a clock disable signal, and a temperature threshold signal, and generates control signals for controlling the magnitude of the potential of the power supplied to the combinational logic block and the memory block by the power supply block.

18 Claims, 6 Drawing Sheets

METHOD AND SYSTEM FOR INTEGRATED CIRCUIT POWER SUPPLY MANAGEMENT

BACKGROUND OF THE INVENTION

The present invention relates generally to integrated circuits (ICs) and more particularly, to power supply management within ICs.

Electronic devices such as laptops, mobile phones, and computers function based on the operation of several ICs. The demand for reduction in the dimensions and increased speed has sparked several developments in semiconductor technology that have resulted in considerable miniaturization of ICs and device sizes. The increasing complexity and high frequency operations have resulted in ICs having high dynamic and static power consumption. The static power is dissipated when the IC is in low power mode, e.g., stand-by, sleep mode, idle and hibernate, while the dynamic power consumption occurs when the chip performing tasks. For devices powered by batteries, static and dynamic power consumption are critical parameters because high power consumption drains the battery quickly. However, for circuits that remain in the low power mode for most of their life, such as the ICs used in the automobile safety systems, reducing static power consumption is more crucial than reduction in dynamic power consumption.

Static power consumption is due to leakage current and sub-threshold current flowing in the transistors of the IC. Therefore, reducing the leakage current will reduce the static power consumption. Several techniques, such as biasing the sources of the transistors (source biasing) or biasing the body of the transistors (well biasing), have been used for reducing leakage current in applications other than automotive applications. However, the hostile environment of an automobile (attributed to high engine temperature, mechanical vibration, dust, etc.), has hampered the usage of the above-mentioned techniques due to low power supply rejection ratios (PSRR) of power regulators inside the ICs. The low values of PSRR may be attributed to high values (in the order of millilamperes (mA)) of leakage currents drawn by the IC during the low power modes. The high leakage currents are a result of high operating temperature of the IC (highly probable in an automobile environment) or when clocks received by the IC are configured to remain switched on in the low power mode to run basic time keeping functions.

Due to the low PSRR, the output power provided to an array of source biased memory cells (which are combinations of n-type and p-type metal oxide semiconductor field effect transistors (NMOS and PMOS)) may have an irregular voltage profile. The magnitude of the glitches in the voltage profile may be more than the noise margin of the memory cells. It is known that source biasing increases the threshold voltage ($V_t$) of an NMOS transistor. Therefore, when the supply voltage drops, the probability of the PMOS transistor pulling the memory cell from zero to one increases, which flips the memory cell. Thus, to implement source biasing in a noisy environment, the switching on/off of the feature needs to be carefully controlled.

Another solution for reducing static power consumption is the use of state retention power gated (SRPG) cells in which 90% of the memory cells are always switched off. Typically, SPRG cells include latches powered by two power rails where one of the power rails is always switched on and the other is switched off for 90% of the memory cell operation. However, the timing critical nature of the above solution makes it unsuitable for automotive applications since there may be several timing violations in the automotive environment due to supply noise. Additionally, the use of multiple power rails complicates the layout of the IC. It would be advantageous to be able to reduce static power consumption of ICs that are used in hostile environments.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE PRESENT INVENTION

Figure 1:
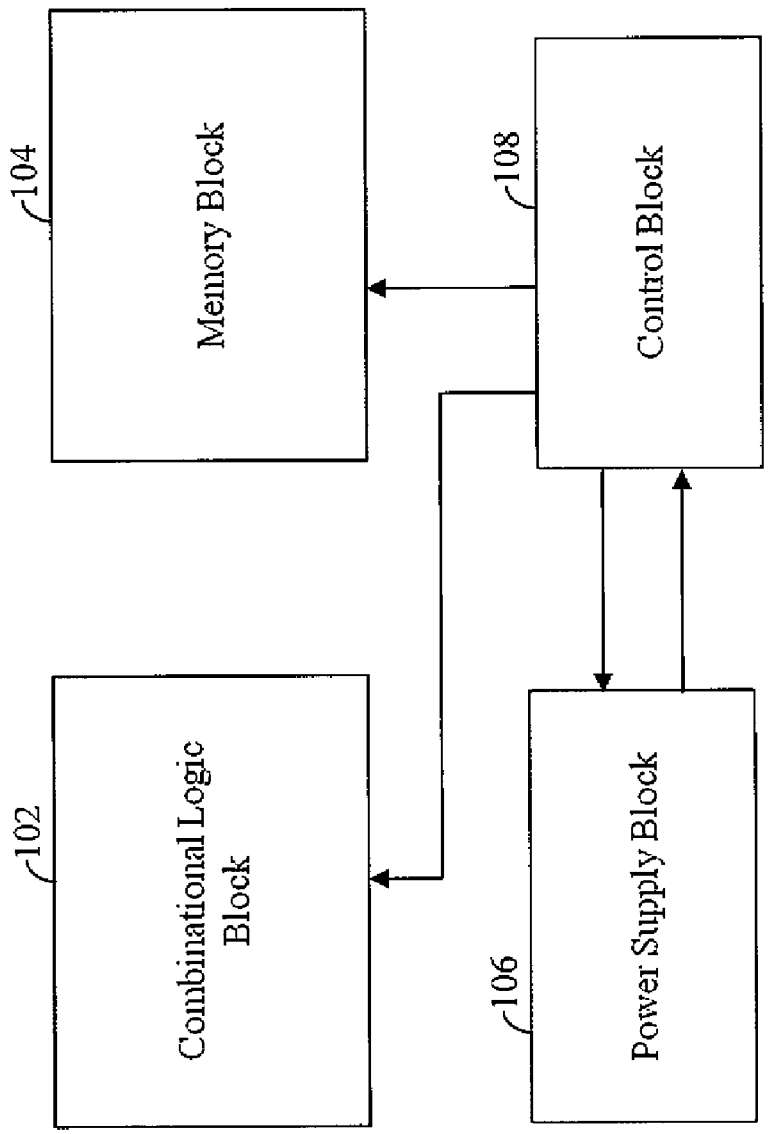
FIG. 1 is a schematic diagram of an IC in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for managing the way power is supplied in an integrated circuit that includes a combinational logic block and a memory block is provided. The combinational logic block includes a plurality of standard cells and the memory block includes a plurality of memory cells. The method includes receiving a software generated power down signal. The software functions in accordance with one or more predefined rules for low power mode. The rules include commands for disabling one or more clock signals in order to control the supply of power to the standard cells. The supply of power to the standard cells is controlled by disabling and enabling the supply of power to the standard cells. The clock disable signal, which is generated by software, disables one or more clock signals received by the combinational logic block and memory block. Further, the operating temperature of the integrated circuit is detected. A source biasing potential is provided to the memory cells based on the clock disable signal, the power-down signal, and the detected operating temperature. A well biasing potential also is provided to the standard cells based on the clock disable signal, the power-down signal, and the detected operating temperature. Additionally, a trimmed potential is provided to the standard cells based on the power-down signal and the operating temperature, where the trimmed potential is less than a low power mode potential provided to the standard cells.

In another embodiment of the present invention, a system for managing the supply of power supply in an integrated circuit (IC) is provided. The IC includes a combinational logic block and a memory block in which the combinational logic block includes a plurality of standard cells and the memory block includes a plurality of memory cells. The system includes a power supply block and a control block. The power supply block includes a first power regulator, connected to the plurality of standard cells, for providing a first potential. The first power regulator includes a first amplifier that receives a bandgap reference potential. The power supply block further includes a second power regulator, connected to the plurality of standard cells, for providing a second potential that is less than the first potential. The second power regulator includes a second amplifier that receives at least one of the bandgap reference potential and a reduced bandgap reference potential. A third power regulator is connected to the standard cells for providing a well biasing potential to the standard cells. The third power regulator includes a third amplifier that receives the bandgap reference potential. A temperature sensor is provided for generating a temperature threshold signal. The temperature sensor includes a fourth amplifier that receives the bandgap reference potential and a fourth potential, wherein the fourth potential is proportional to an operating temperature of the IC. The fourth amplifier generates the temperature threshold signal based on the bandgap reference potential and the fourth potential.

The control block, which is connected to the power supply block, includes a source bias signal generator, a supply selector, and a trim-down signal generator. The source bias signal generator receives a power-down signal, a clock disable signal, and the temperature threshold signal from the power supply bloc. The power-down signal is generated by software that includes one or more predefined rules for low power mode, which include commands for disabling one or more clock signals received by the IC. The source bias signal is generated based on the temperature threshold signal, the clock disable signal, and the power-down signal. The source bias signal is provided to the memory cells for switching supply of a source biasing potential to the memory cells.

The supply selector is connected to the second power regulator, the third power regulator, and the standard cells, and receives the power-down signal, the clock disable signal, the temperature threshold signal, the second potential, and the well biasing potential. The supply selector selects at least one of the second potential and the well biasing potential based on the power-down signal, the clock disable signal, and the temperature threshold signal, and provides one of the second potential or the well biasing potential to the standard cells.

The trim-down signal generator, which is connected to the second power regulator, generates a trim-down signal for reducing the magnitude of the second potential based on the temperature threshold signal and the power-down signal.

Various embodiments of the present invention provide a method and system for managing the supply of power within an IC, where the IC includes a combinational logic block, a memory block, a power supply block, and a control block. The combinational logic block includes a plurality of standard cells and the memory block includes a plurality of memory cells. The combinational logic block is supplied power from the power supply block, and the power supply block is controlled by the control block. Additionally, power supplied to the memory block is controlled by the control block. The control block receives a clock disable signal, a power down signal, and a temperature threshold signal. The clock disable signal is responsible for disabling or enabling the switching of one or more clock signals received by the combinational logic and memory blocks. The power down signal indicates the power mode of the IC. The temperature threshold signal indicates whether the operating temperature of the IC is below or above a threshold temperature.

The control block generates a source bias signal and a trim down signal, and provides either a low power regulator potential or a well biasing potential to the standard cells based on the power down signal, the clock disable signal, and the temperature threshold signal. When the IC is in low power mode, (a) the clock disable signal is high indicating the high frequency clocks received by the combinational logic and memory block are disabled, and (b) the operating temperature of the IC is less than the threshold temperature. When both the conditions (a) and (b) are true, the current drawn by the memory cells is on the order of microamperes ($\mu A$). Thus, the source bias signal is switched high to enable source biasing of the memory cells, which leads to further reduction in power dissipation. However, when either or both of the conditions (a) and (b) are false, the current drawn by the memory cells is on the order of mA. Thus, in a hostile environment, such as an automobile environment, switching on source biasing of the memory cells may lead to flipping of the memory cells due to a bad PSRR of the power regulator inside the IC. Therefore, the source bias signal is switched to low by the control block in order to disable the source biasing of the memory cells during conditions when high power is drawn by the memory cells.

Further, when the clock disable signal is high and the operating temperature is less than the threshold temperature, the control block provides a well biasing potential to the standard cells, which further reduces power dissipation in the standard cells. However, when the clock disable signal is low and/or the operating temperature of the IC is more than the threshold temperature, the standard cells are provided a low power regulator potential. Additionally, when the operating temperature of the IC is greater than the threshold temperature, the low power regulator potential provided to the standard cells is decreased by a predetermined amount through trimming. The predetermined amount is within the noise margin limits of the standard cells, ensuring that the performance of the standard cells is not affected. Reducing the low power regulator potential leads to reduction in the dynamic and leakage power dissipated. This is a significant savings since the dynamic dissipated power is proportional to the square of power supply potential. The dynamic power dissipation is due to clock active in low power mode.

Referring now to FIG. 1, a schematic diagram illustrating an IC 100 in accordance with an embodiment of the present invention is shown. The IC 100 includes a combinational logic block 102, a memory block 104, a power supply block 106, and a control block 108.

The combinational logic block 102 includes a plurality of standard cells. The standard cells include logic gates, viz. AND, OR, NAND, NOR, NOT and the like and simple metal programmable structures, such as Phase Locked Loops (PLLs) made from several transistors. The memory block 104 includes a plurality of memory cells. Each of the memory cells is composed of several NMOS and PMOS transistors. The combinational logic block 102 receives power from the power supply block 106. The power provided by the power supply block 106 is controlled by the control block 108. The memory block 104 is supplied with power from a separate power supply block (not shown) due to specific grid voltage requirements of the memory block 104. The control block 108 is capable of controlling the power supplied to the memory block 104. The method of controlling the power provided to the combinational logic block 102 and the memory block 104 will be explained in detail with reference to FIGS. 2, 3, 4A, 4B, and 5.

Figure 2:
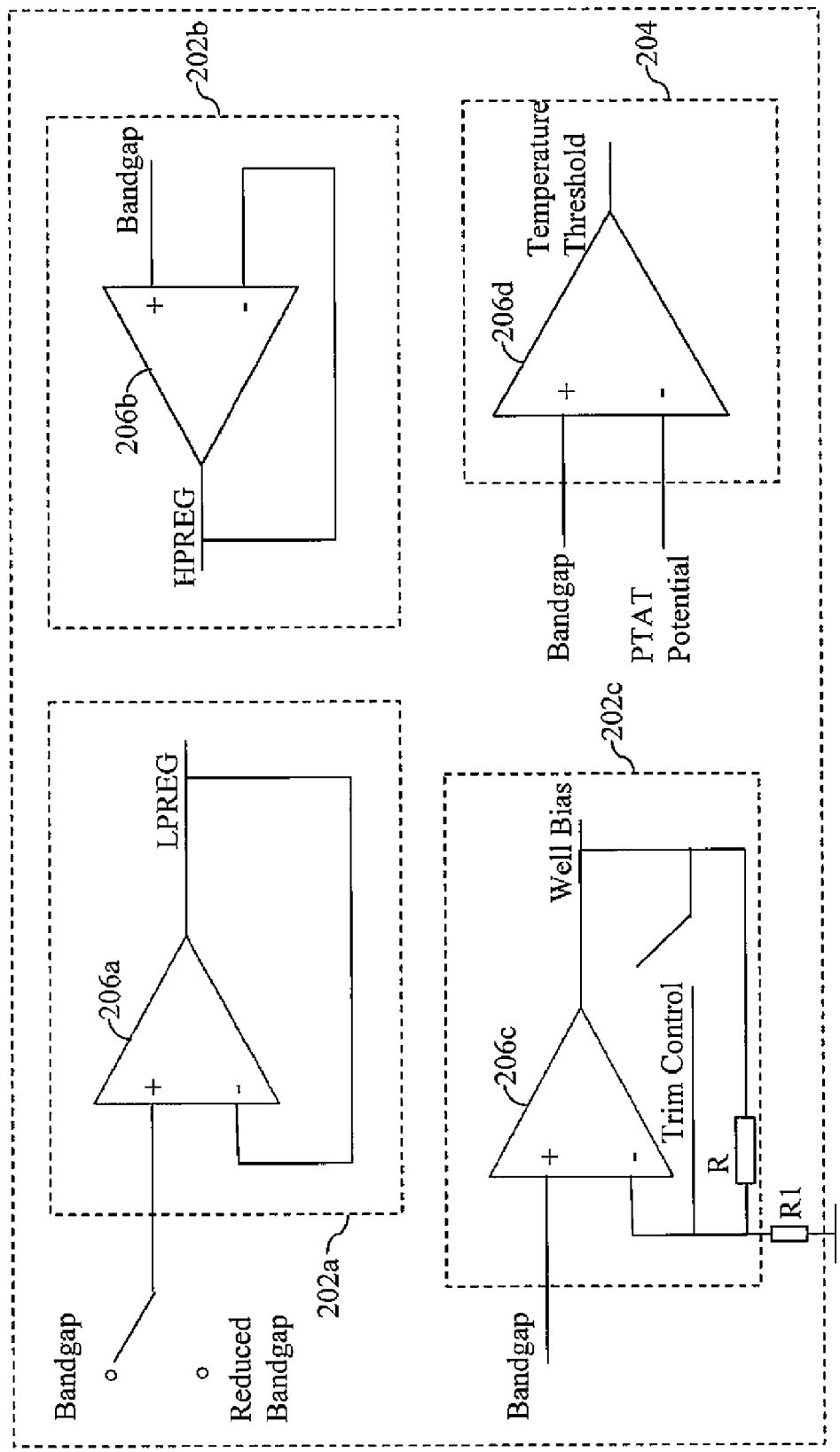
FIG. 2 is a schematic diagram of a power supply block in accordance with an embodiment of the present invention.

Referring now to the FIG. 2, a schematic diagram illustrating the power supply block 106 in detail in accordance with an embodiment of the present invention is shown. The power supply block 106 includes power regulators 202a, 202b, and 202c, and a temperature threshold sensor 204. The power regulators 202a, 202b, and 202c include amplifiers 206a, 206b, and 206c respectively. The temperature threshold sensor 204 includes an amplifier 206d.

The power regulators 202a, 202b, and 202c function as power filters. The power regulators 202a, 202b, and 202c are provided unfiltered input power. The power regulators 202a, 202b, and 202c filter out the noise in the input power and provide a regulated and a constant potential output. Each of the amplifiers 206a, 206b, and 206c is connected in negative feedback loop configuration. Further, each of the amplifiers 206a, 206b, and 206c is provided a bandgap reference potential at positive terminals of each of the amplifiers 206a, 206b, and 206c. The bandgap reference potential is generated using circuits that generate currents proportional and complementary to an absolute operating temperature of the IC 100 (refer FIG. 1). The proportional and the complementary currents are known as proportional to absolute temperature (PTAT) and complementary to absolute temperature (CTAT) currents. The PTAT and the CTAT currents are added to obtain a constant output current independent of the absolute operating temperature of the IC 100. The negative feedback loop configuration of each amplifier enables maintaining a constant output potential at the amplifier output which is equal to the potential provided at the positive terminal of the amplifier. Therefore, the amplifiers 206a, 206b, and 206c connected in a negative feedback loop configuration serve as power regulators.

The power regulators 202a, 202b, and 202c provide outputs with different potentials. For example, the power regulator 202a is a low power regulator (LPREG) that provides power supply to the combinational logic unit 104 (refer FIG. 1) during the low power modes such as stand-by and stop modes of the IC 100 (refer FIG. 1). It should be realized by persons skilled in the art that during the low power modes, only a predetermined percentage of standard cells belonging to the combinational logic unit 104 are provided power supply. In an embodiment of the present invention, 5% of the standard cells belonging to the combinational logic unit 104 are provided power supply by the power regulator 202a during the low power modes. Further, the amplifier 206a is provided either a constant bandgap reference potential or a reduced bandgap reference potential at positive terminal. The bandgap reference potential is reduced by a predetermined value to obtain the reduced bandgap reference potential. The predetermined value is selected based on the characteristics of the transistors used for designing the combinational logic unit 104. In an embodiment of the present invention, the predetermined value is 100 millivolts (mV). The option to select either the bandgap or the reduced bandgap reference potentials as inputs to the amplifier 206a enables the output potential of the power regulator 202a to be reduced by the predetermined value. The reduced output potential is hereinafter referred to as the trimmed potential. When the combinational logic block 102 is supplied the trimmed potential, viz. when one or more clock signals received by the IC 100 are switched on, static and dynamic power dissipation is reduced.

The power regulator 202b is a high power voltage regulator (HPREG) that provides potential to the combinational logic block 104 during the high power mode or the run mode of the IC 100. Further, the power regulator 202c provides well bias potential to the plurality of standard cells belonging to the combinational logic block 104. It is known that the well bias potential is higher than the LPREG potential provided by the power regulator 202a. To provide an output higher than the LPREG potential, a resistor R is introduced in the negative feedback loop of the amplifier 206c. The value of resistor R can be selected to ensure that the output potential of the power regulator 202c is predetermined units higher than the LPREG potential. In an embodiment of the present invention, the value of resistance introduced in the negative feedback loop of the amplifier 206c may be digitally trim controlled to obtain an accurate well biasing potential.

The temperature threshold sensor 204 provides a temperature threshold signal. The amplifier 206d receives the bandgap reference potential at positive terminal and PTAT potential at negative terminal. The PTAT potential provided at the negative terminal is derived from the circuit used to generate bandgap reference potential as explained above. The PTAT potential is scaled prior to being provided to the amplifier 206d. The amplifier 206d functions as a comparator and compares the bandgap reference potential with the PTAT potential to generate the temperature threshold signal. The temperature threshold signal indicates whether the operating temperature of the IC 100 has exceeded a threshold temperature. The threshold temperature can be selected based on the system requirements. In an embodiment of the present invention, 45° C. is selected as the threshold temperature. Since, at high temperatures, viz. >45° C., the leakage current drawn by the transistors present in the IC 100 becomes of the order of mA, power saving features such as source biasing, well biasing, and LPREG potential trim down need to be monitored. The knowledge of the operating temperature exceeding the threshold temperature facilitates monitoring of such power saving features, thereby preventing undesired results such as bit flipping in the memory cells.

Figure 3:
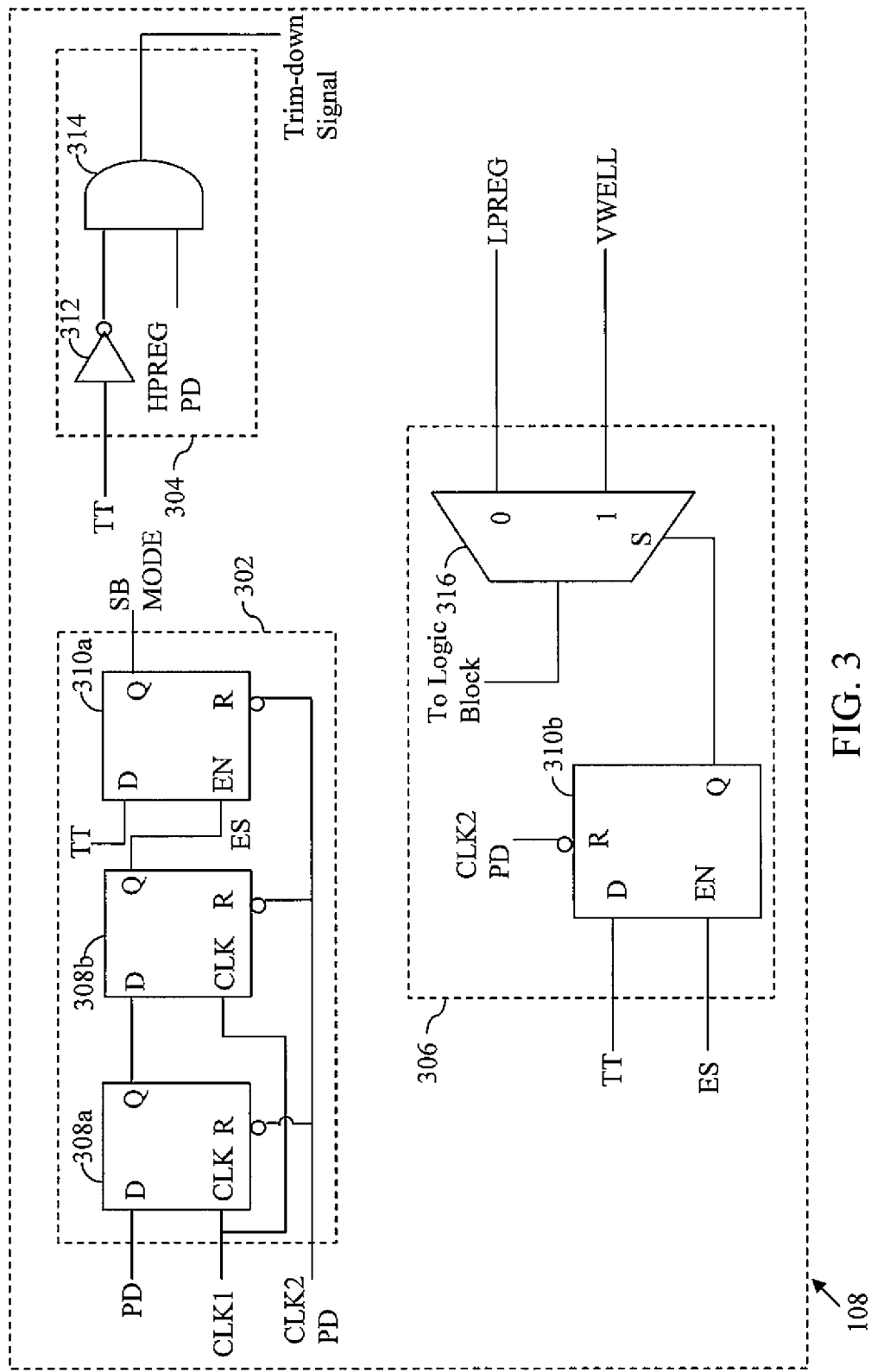
FIG. 3 is a schematic diagram of a control block in accordance with an embodiment of the present invention.

Referring now to FIG. 3 a schematic diagram illustrating the control block 108 in detail in accordance with an embodiment of the present invention is shown. The control block 108 includes a source bias signal generator 302, a trim-down signal generator 304, and a supply selector 306. The source bias signal generator 302 includes flip-flops 308a and 308b, and a latch 310a. The trim-down signal generator 304 includes a NOT gate 312 and an AND gate 314. The supply selector 306 includes a latch 310b and a multiplexer 316.

As explained in conjunction with FIG. 1, the control block 108 provides output signals of the source bias signal generator 302, the trim down signal generator 304, and the supply selector 306 to the power supply block 106 and to the memory block 104. The output signals include control signals and the output potentials. The control signals and the output potentials are such that static and dynamic power dissipation during the low power modes of the IC 100 (FIG. 1) is decreased.

The source bias generator 302 receives a power down signal (PD), a first clock signal (CLK1), and a second clock power down signal (CLK2 PD). The PD signal and the CLK1 signal is provided to a data input terminal D and a clock input terminal CLK of the flip-flop 308a respectively. The CLK1 signal and the CLK2 PD signal enable operation of the IC 100. The CLK1 signal is also provided to a clock input terminal CLK of the flip-flop 308b. The CLK2 PD signal is provided to reset input terminals R of the flip-flops 308a and 308b, and the latch 310a. In an embodiment of the present invention, the flip-flops 308a, 308b, and 308c are D type flip-flops which are reset when CLK2 PD signal becomes low and operate at the rising edge of the CLK1 signal. Further, output from output terminal Q of flip-flop 308a is provided to input terminal D of the flip-flop 308b and output from output terminal Q of the flip-flop 308b is provided to enable input terminal EN of the latch 310a. Output of the latch 310a is a source bias signal (SB MODE). The SB MODE signal is provided to the memory block 104 for switching on or off supply of a source biasing potential to the memory block 104. As it will be subsequently explained in detail, in conjunction with FIGS. 4A and 4B, that the SB MODE signal becomes high only when the low power mode is activated, i.e. PD signal becomes high, the second clock signals are disabled, i.e. CLK PD2 signal is high, and operating temperature of the IC 100 is below the threshold temperature (TT), i.e. a TT signal is high. Switching on the supply of the source bias potential i.e. the SB MODE signal is high, feature in scenarios when the second clock is activated, i.e. the CLK PD2 signal is low and/or the operating temperature is above the threshold temperature, i.e. the TT signal is low, increases the risk of memory cells flipping the stored binary values for reasons explained above.

The trim down signal generator 304 receives the TT signal and high power regulator power down (HPREG PD) signal. The TT signal is provided to the NOT gate 312 and the HPREG PD signal is provided to the AND gate 314. The output of the NOT gate 312 is also provided to the AND gate 314. The output of the AND gate 314 is the trim down signal, which is provided to the power regulator 202a. The trim down signal switches on/off LPREG potential trim down feature of the power regulator 202a. Switching on the trim down feature results in the power regulator 202a (FIG. 2) providing a reduced LPREG potential output or the trimmed potential which reduces static and dynamic power dissipation. The trim down signal is high only when the TT signal is low and the HPREG PD signal is high, which implies that operating temperature of the IC 100 is above the threshold temperature and the HPREG is switched off. The switching off of the HPREG is dependent on the state of PD signal. The HPREG is switched off in response to the PD signal becoming low, i.e. a low power mode of the IC is being activated. As will be explained later that when the TT signal is low, supply of the well biasing potential to the standard cells belonging to the combinational logic block 102 is disabled and the combinational logic block 102 is provided the LPREG potential. It should be realized by persons skilled in the art that reducing supply potential of a MOSFET reduces the power dissipated by the standard cells. Since, the standard cells of the combinational logic circuit 102 have a noise margin, lowering the supply potential within the noise margin limits will not affect the functioning of the standard cells and will enable decrease in the magnitude of the power dissipated by the standard cells. Therefore, switching the trim down signal to high state when the TT signal is low, enables the trim down feature of the power regulator 202a. As a result, the LPREG potential is reduced to provide the trimmed potential to the combinational logic circuit 104, thereby reducing the power dissipation in the combinational logic circuit 102.

The supply selector 306 receives the TT signal, output signal of flip-flop 308b (ES), and the CLK2 PD signal at an input terminal D, at an enable terminal EN, and at a reset terminal R of the latch 310b respectively. The output obtained from output terminal Q of the latch 310b is provided to selector terminal S of the multiplexer 316. When the PD and CLK2 PD signals are high, the latch 310b becomes transparent and an output signal of the latch 310b is equal to an input signal at the input terminal D of the latch 310b. Since, the TT signal is provided at the input terminal D, the output of the latch 310b is high when the TT signal is high, i.e. the operating temperature of the IC 100 is below the threshold temperature. When the output signal of the latch 310b is high, the multiplexer 316 selects the well biasing potential for being supplied to the combinational logic block 102. When during low power mode, i.e. the PD signal is high, if the CLK2 PD signal is high and/or the TT signal is low, the output signal of the latch 310b is low and the LPREG potential is selected to be supplied to the combinational logic block 102. The operation of the control unit is explained further in conjunction with the logic timing diagrams of FIGS. 4A and 4B.

Figure 4A:
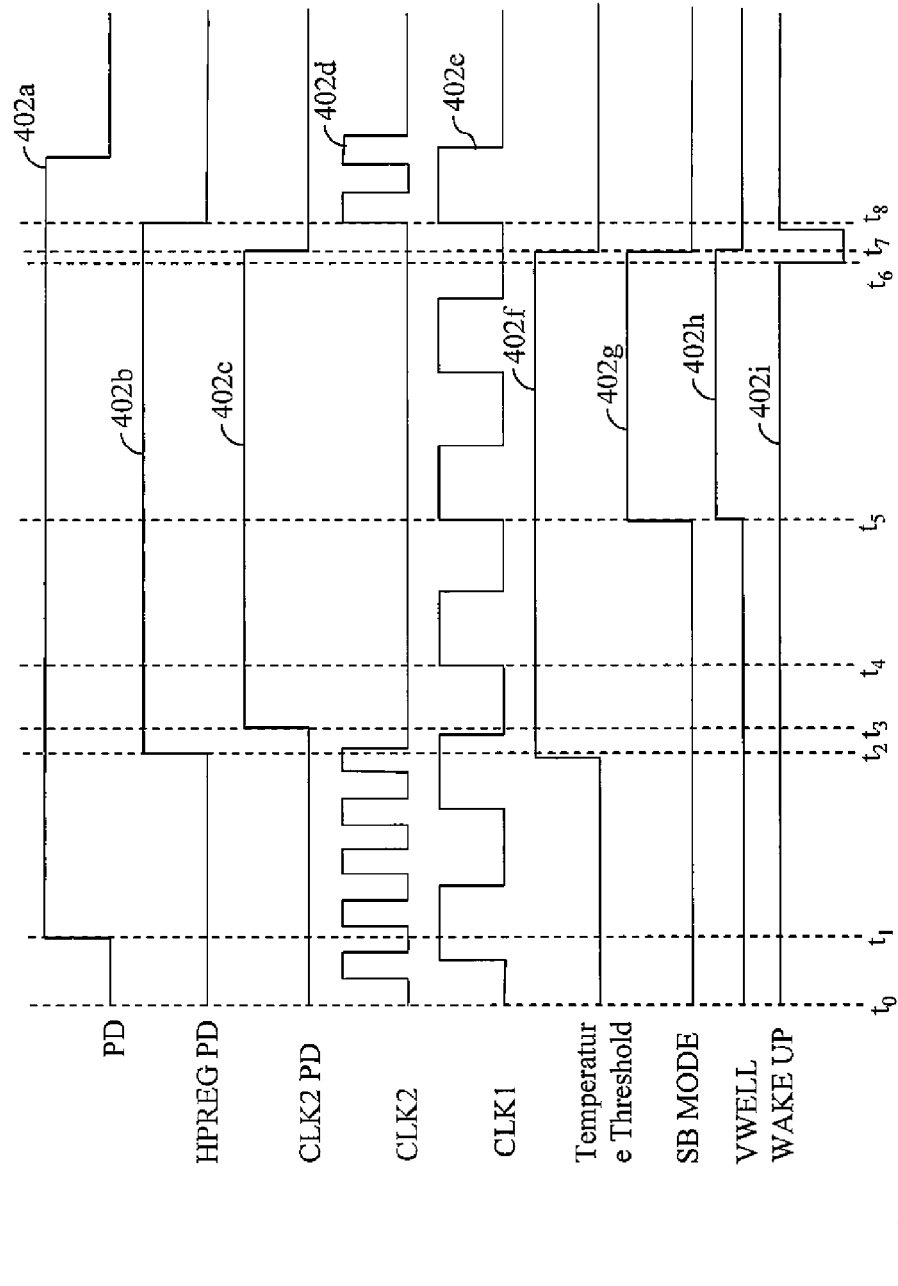
FIGS. 4A and 4B are logic timing diagrams illustrating operation of the power supply block and the control block in accordance with an embodiment of the present invention.
Figure 4B:
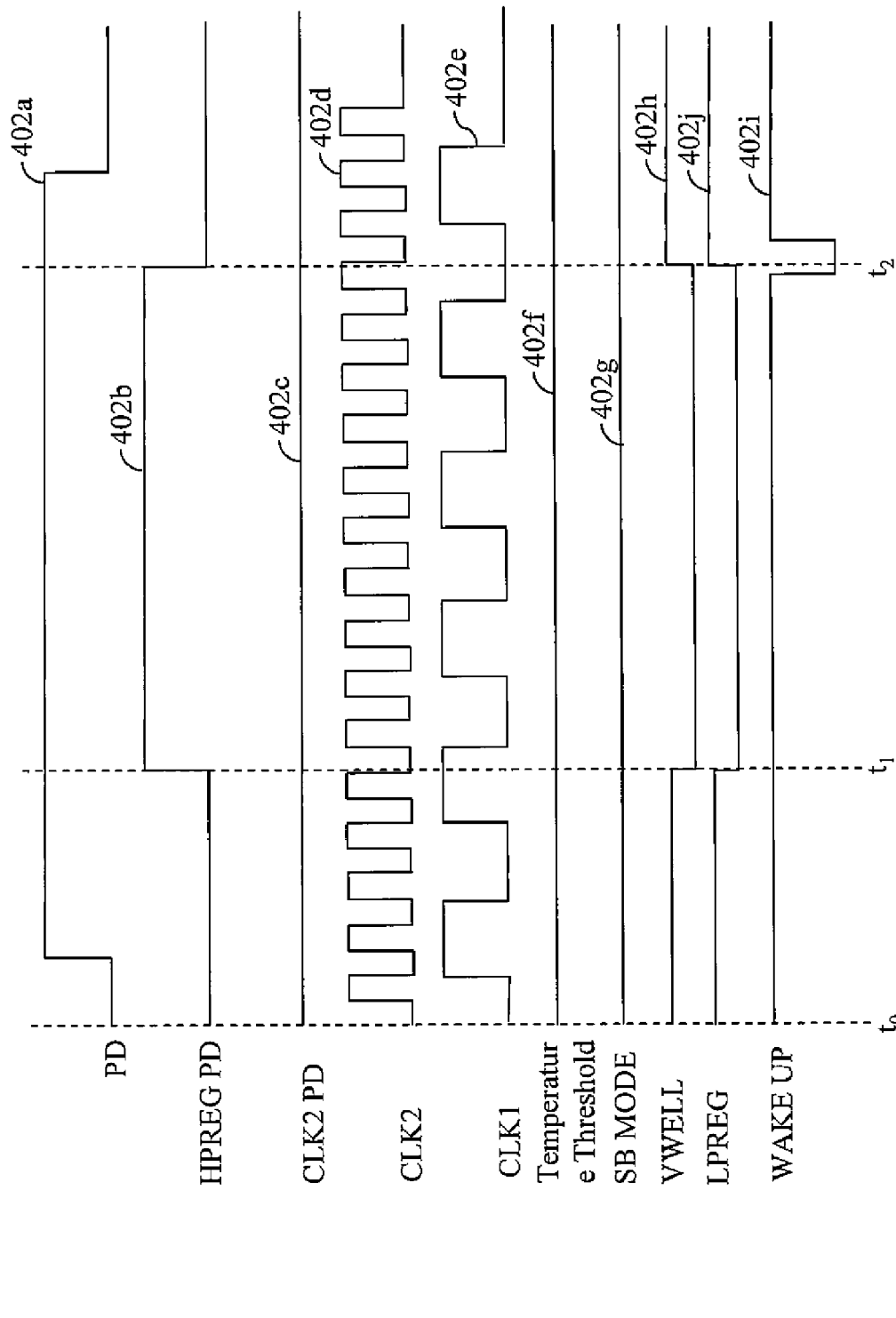

Referring now to FIGS. 4A and 4B, logic timing diagrams 400a and 400b illustrating operation of the power block 106 and the control unit 108 in accordance with an embodiment of the present invention are shown. The logic timing diagram 400a illustrates the operation of the power block 106 and the control unit 108 when the operating temperature of the IC 100 is less than the threshold temperature. The logic timing diagram 400a includes signal traces 402a, 402b, 402c, 402d, 402e, 402f, 402g, 402h, and 402i. The logic timing diagram 400b illustrates the operation of the power block 106 and the control unit 108 when the operating temperature of the IC 100 is more than the threshold temperature. The logic timing diagram 400b includes a signal trace 400j in addition to the signal traces depicted in the logic timing diagram 400a.

The signal traces 402a, 402b, 402c, 402d, 402e, 402f, 402g, 402h, and 402i correspond to the PD signal, the HPREG PD signal, the CLK2 PD signal, the CLK2 signal, the CLK1 signal, the TT signal, the SB MODE signal, a well biasing potential (VWELL), and a WAKE UP signal respectively. At time $t_1$, the PD signal switches to high state, i.e., low power mode of the IC 100 (FIG. 1) is activated. The PD signal preferably is generated by software that includes one or more predefined rules for the low power mode, in which the one or more predefined rules include commands for disabling clock signals received by the integrated circuit. The PD signal is received by the control block 104 of the IC 100. The low power mode may be a stand-by or a stop mode. The switching to high state of the PD signal initiates a sequence of events in the IC 100 such as switching to high state of the HPREG PD signal at time $t_2$. This results in the high power regulator switching off. Subsequently, at time $t_3$, the CLK2 PD signal switches to a high state which leads to the CLK2 signal switching off. The CLK2 PD signal is generated by the software code. In an embodiment of the present invention, the CLK2 signal is a high frequency clock signal with the frequency of the order of Mega Hertz (MHz) such as 16 MHz. Due to high frequency of the CLK2 signal, the dissipation caused by switching of the CLK2 signal is appreciable. Therefore, to reduce dissipation, the control logic external to the IC 100 switches the CLK2 PD signal to high state. Subsequent to time $t_3$, CLK2 signal is switched off, thereby reducing power dissipation.

Referring now to FIG. 3, prior to time $t_3$, CLK2 PD is low, as a result the flip-flop 308a is in reset state, due to which output at the output terminal Q of the flip-flop 308a is low. Since, the CLK2 PD signal is also provided to the reset terminals of the flip-flop 308b and the latch 310a, output at output terminals of the flip-flop 308b and the latch 310a is low. Therefore, the SB MODE signal (output of the latch 310a) is low during the time period (time $t_0$ to time $t_3$) when the CLK2 PD signal is low or the CLK2 signal is enabled. The low state of the SB MODE signal does not switch on the supply of the source bias potential to the memory block 104. Not switching on the supply of the source bias potential during the time period when the CLK2 signal is switched on ensures that there is no undesired flipping of memory cells in the memory block 104 due to high values of threshold voltage of the memory cells.

When at time $t_3$, the CLK2 PD signal switches to high state, and as a consequence, the CLK2 signal is disabled, the reset mode of the flip-flops 308a and flip-flop 308b, and the latch 310a ends. Subsequently, the flip-flops 308a and 308b operate at the rising edge of the CLK1 signal and the latch 310b operates when the ES signal provided at the enable terminal EN is switched to a high state. Therefore, at time $t_4$, the CLK1 signal is switched to high state. This results in the flip-flops 308a and 308b becoming transparent which results in propagation of input signal provided at the input terminals of the flip-flops 308a and 308b to the output terminals of the flip-flops 308a and 308b. Since, the PD signal is high, output signal of the flip-flop 308a becomes high. Since, output signal of the flip-flop 308a is provided to input of the flip-flop 308b, the input signal at the input terminal D of the flip-flop 308b also becomes high.

At time $t_5$, the CLK1 signal becomes high again, rendering the flip-flops 308a and 308b transparent. Since, input signal at an input terminal D of the flip-flop 308b is high, the output signal at the output terminal Q of flip-flop 308b becomes high. The output signal of the flip-flop 308b is provided to the enable terminal EN of the latch 310a. Since, the output signal is high, the latch 310a is enabled, thereby propagating the input signal provided at the input terminal D of the latch 310a to the output terminal Q of the latch 310a. The TT signal is provided at the input terminal of the latch 310a. Since, the TT signal is high (the operating temperature of the IC is below the threshold temperature) at time $t_5$, output signal (the SB MODE signal) at the output terminal Q also becomes high. It should be noticed, that the source biasing feature, controlled by the SB MODE signal, is switched on during the low power modes of the IC 100 only when a) the CLK2 signal is disabled and b) when the operating temperature is below the threshold temperature. Switching on the source biasing feature when either of the conditions a) and b) is false, increases the risk of flipping of the memory cells belonging to the memory block 104.

The latch 310b receives the TT signal, the ES signal, and the CLK2 PD signal at the input terminal D, the enable terminal EN, and the reset terminal R, respectively. As explained for the latch 310a above, the CLK2 PD signal switching to high state enables the latch 310b to operate in synchronization with the ES signal provided at the enable terminal EN of the latch 310b. At time $t_5$, when ES becomes high, the latch 310b becomes transparent and the TT signal provided to the data input terminal D of the latch 310b is propagated to the output terminal Q of the latch 310b. The output signal from the latch 310b is provided to the selector terminal S of the multiplexer 316. When the TT signal is high, the multiplexer selects VWELL as the supply potential of the power supply to be provided to the combinational logic block 102. When the TT signal is low, the LPREG potential is selected as the supply potential of the power supply to be provided to the combinational logic block 102. Therefore, VWELL is selected as the supply potential of the power supply during the low power modes of the IC 100, only when a) the CLK2 PD signal is enabled and b) the operating temperature of the IC 100 is below the threshold temperature. Since, if either of the conditions a) and b) is false, current drawn by the standard cells belonging to the combinational logic block 102 is of the order of mA. Therefore, a few microamperes (µA) reduction in the current drawn by the combinational logic block 102 will not reduce the power dissipation by a substantial amount. Therefore, it is not beneficial to switch on the well biasing feature when either of the conditions a) and b) is false.

Further, at time $t_6$, the WAKE UP signal becomes low implying that the low power mode of the IC 100 needs to be deactivated. The WAKE UP signal is generated by the control logic external to the IC 100. In response to the WAKE UP signal becoming low, the CLK2 PD signal becomes low at time $t_7$, simultaneously the SB MODE signal becomes low.

As a result, the supply of the source bias potential to the memory block 104 is disabled. Since, subsequent to time $t_8$, the CLK2 signal is enabled and run mode of the IC 100 is activated, the current consumption of the memory block 104 becomes high. Thus, the source biasing is disabled at time $t_7$, prior to the CKL2 signal becoming enabled, thereby eliminating any probability of the source biasing feature remaining enabled when the CLK2 signal starts to switch.

Additionally, the output of the AND gate 316, i.e. the trim down signal stays low when the TT signal is high. This ensures that the trimming of the LPREG potential is not activated, although HPREG PD is high. This ensures that the LPREG potential is not trimmed, since the potential of the power supplied to the combinational logic block 102 is VWELL and therefore trimming of LPREG potential will not lead to significant reduction in power dissipation.

Referring now to FIG. 4B, the signal trace 402j corresponds to the LPREG potential. The TT signal is low indicating that the operating temperature of the IC 100 is above the threshold temperature. The PD and the HPREG PD signals follow the switching pattern identical to the pattern depicted in the logic timing diagram 400a. The CLK2 PD signal remains low throughout the time period from time $t_0$ to time $t_2$. Therefore, the CLK2 signal remains enabled throughout the time period from time $t_0$ to time $t_2$. Since, CLK2 PD is low, the flip-flops 308a and 308b and the latches 310a and 310b remain in the reset mode, which results in the outputs of the flip-flops 308a and 308b and the latches 310a and 310b remaining low. Thus, the SB MODE signal is low, so the supply of the source bias potential to the memory block 104 is disabled, which is desired since the CLK2 signal is enabled.

Further, the input signal provided to the selector terminal S of the multiplexer 316 is low. As a result, the multiplexer 316 selects the LPREG potential as the supply potential of the power supplied to the combinational logic block 102. To reduce the power dissipation in the standard cells belonging to the combinational logic block 102, the LPREG potential is trimmed down. The trimming of LPREG potential is enabled since the trim down signal is high. The trim down signal is switched high at time $t_1$, which is when the HPREG PD signal becomes high (TT signal being already low) and simultaneously, the LPREG potential is trimmed. The trimming of the LPREG potential reduces power consumption in the combinational logic block 102 since the power consumption is proportional to square of power supply potential. Additionally, the VWELL potential is lowered. This is done to ensure that the well biasing feature is disabled and the well is at same potential as LPREG regulator potential. Thereafter, at time $t_2$, the HPREG PD becomes low, as a result the trim down signal also becomes low, thereby switching off the LPREG potential trim down feature. Simultaneously, the VWELL potential is notched up to the same level as LPREG potential.

Figure 5:
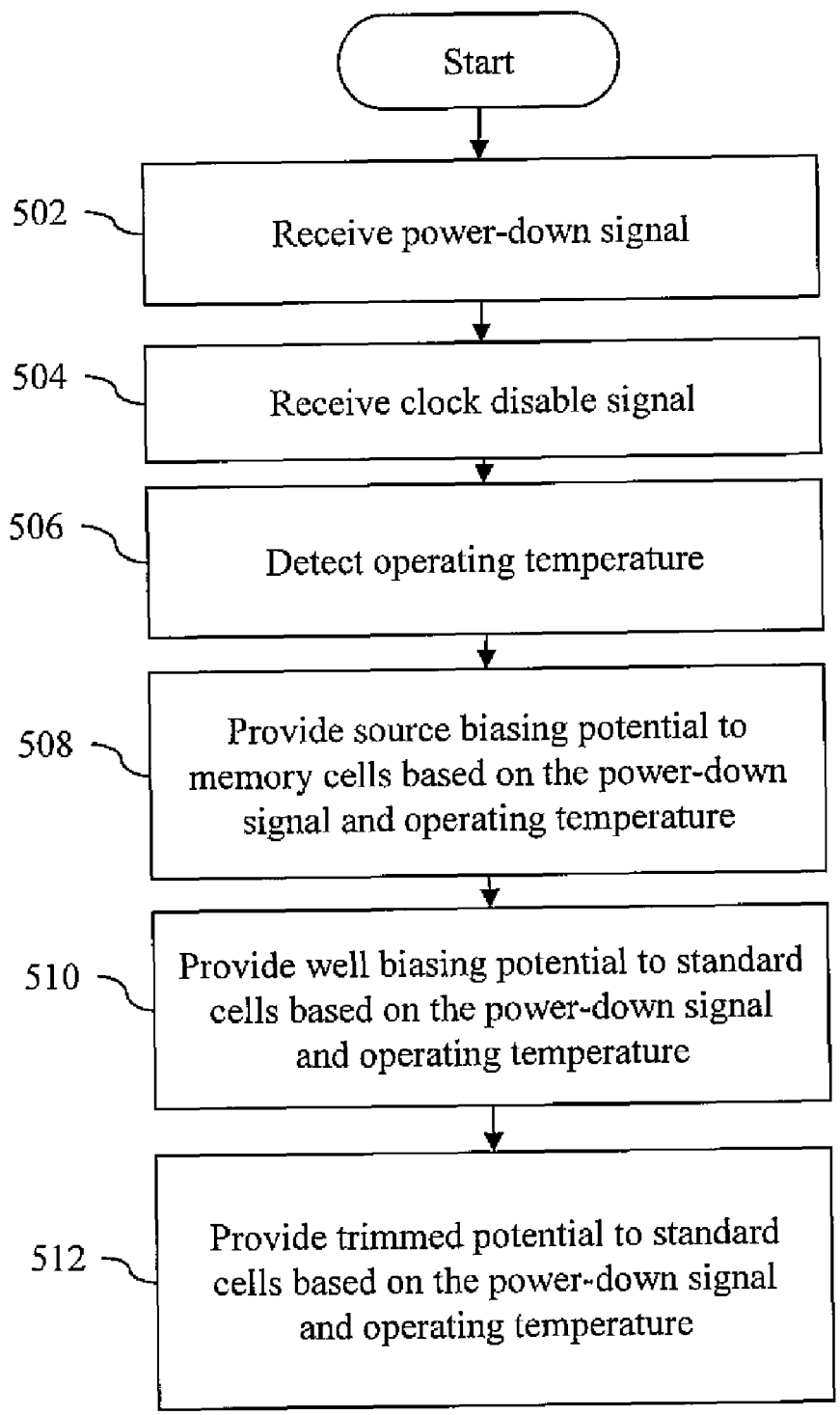
FIG. 5 is a flowchart of a method for managing power supply in an integrated circuit in accordance with an embodiment of the present invention.

Referring now to FIG. 5, a flowchart 500 illustrating a method for managing the supply of power in an IC in accordance with an embodiment of the present invention is shown. Beginning at step 502, a power down signal is received by a control block belonging to an IC. The power down signal preferably is generated by software. The software includes predefined rules for the low power mode in which the one or more predefined rules comprise one or more commands for disabling one or more clock signals received by the integrated circuit. When the power down signal is high, low power mode of the IC is activated. The low power mode may be a stand-by mode or a stop mode. At step 504, a clock disable signal is received by the control block. The clock disable signal is generated by the software and is responsible for disabling one or more clock signals generated within the IC. In an embodiment of the present invention, the one or more clock signals are high frequency signals, having frequency of the order of MHz such as 16 MHz. Therefore, switching on of such high frequency clock signals consumes appreciable power. To reduce power dissipation it is beneficial to switch off such high frequency clock signals. At step 506, an operating temperature of the IC is detected and a temperature threshold signal is generated. The temperature threshold signal indicates whether the operating temperature has exceeded the threshold temperature. If the operating temperature is greater than the threshold temperature, the temperature threshold signal is high, else the temperature threshold signal is low.

At step 508, a source biasing potential is provided to the plurality of memory cells. The source biasing potential is generated and provided by a power supply responsible for supplying power to the memory cells. However, the control block is capable of switching on and off supply of the source biasing potential to the memory cells using a source bias signal. When source bias signal is high, source biasing of the memory cells is enabled and when source bias signal is low, source biasing of the memory cells is disabled. The source biasing signal is enabled or disabled based on status of the clock disable signal, the power down signal, and the temperature threshold signal. The source biasing of the memory cells is switched on during the low power mode of the IC, and when a) the clock disable signal is low and b) the operating temperature is below the threshold temperature. If either of the conditions a) and b) is false, the source biasing of the memory cells is not enabled for reasons described in conjunction with FIG. 3.

At step 510, a well biasing potential is provided to the standard cells. The well biasing potential is provided based on the clock disable signal, the power-down signal, and the operating temperature of the IC. The control block provides the well biasing potential to the standard cells during the low power modes of the IC and when a) the clock disable signal is low and b) the operating temperature of the IC is less than the threshold temperature. When either of the above conditions is false, a low power regulator potential is provided to the standard cells. At step 512, the low power regulator potential provided to the standard cells is reduced to obtain a trimmed potential. The trimmed potential is generated based on the operating temperature of the IC and the power down signal. When the power down signal is high and the operating temperature is above the threshold temperature, the low power regulator potential is reduced by a predetermined amount to obtain the trimmed potential. The trimmed potential is provided to the standard cells, thereby reducing power dissipation in the standard cells.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. In an integrated circuit, a method of power supply management, wherein the integrated circuit comprises a combinational logic block including a plurality of standard cells, and a memory block including a plurality of memory cells, the method comprising:

receiving a power-down signal and activating a low power mode based on the power-down signal;

receiving a clock disable signal that disables one or more clock signals used to operate the integrated circuit;

detecting an operating temperature of the integrated circuit and generating a temperature threshold signal;

providing a source biasing potential to the plurality of memory cells based on the clock disable signal, the power-down signal, and the temperature threshold signal; and providing a well biasing potential to the plurality of standard cells based on the clock disable signal, the power-down signal, and the temperature threshold signal.

2. The method of power supply management of claim 1, further comprising providing a trimmed potential to the plurality of standard cells based on the power-down signal and the temperature threshold signal, wherein the trimmed potential is less than a low power mode potential provided to the plurality of standard cells.

3. The method of power supply management of claim 1, wherein the power-down signal is generated by software.

4. The method of power supply management of claim 3, wherein the software includes one or more predefined rules including one or more commands for disabling the one or more clock signals received by the integrated circuit.

5. The method of power supply management of claim 4, wherein the clock disable signal is generated by the software.

6. The method of power supply management of claim 1, wherein the low power mode includes at least one of a stand-by mode and a stop mode.

7. A system for management of power supplied in an integrated circuit, the integrated circuit comprising a combinational logic block and a memory block, wherein the combinational logic block comprises a plurality of standard cells and the memory block comprises a plurality of memory cells, the system comprising:

a power supply block, connected to the combinational logic block, wherein the power supply block includes, a first power regulator for providing a first potential, wherein the first power regulator comprises a first amplifier that receives a bandgap reference potential;

a second power regulator for providing a second potential that is less than the first potential, wherein the second power regulator comprises a second amplifier that receives at least one of the bandgap reference potential and a reduced bandgap reference potential;

a third power regulator for providing a well biasing potential to the plurality of standard cells, wherein the third power regulator comprises a third amplifier that receives the bandgap reference potential;

a temperature sensor for detecting an operating temperature of the integrated circuit and generating a temperature threshold signal, wherein the temperature sensor comprises a fourth amplifier that receives the bandgap reference potential and a fourth potential that is proportional to the operating temperature of the integrated circuit, wherein the fourth amplifier generates the temperature threshold signal based on the bandgap reference potential and the fourth potential; and a control block, connected to the power supply block, and the memory block, wherein the control block includes, a source bias signal generator that receives a power-down signal, a clock disable signal, and the temperature threshold signal, and generates a source bias signal that is provided to the memory block for switching supply of a source biasing potential to the plurality of memory cells, and wherein based on the power-down signal, a low power mode of the integrated circuit is activated;

a supply selector that receives the power-down signal, the clock disable signal, the temperature threshold signal, the second potential, and the well biasing potential, wherein the supply selector selects at least one of the second potential and the well biasing potential based on the power-down signal, the clock disable signal, and the temperature threshold signal, and provides at least one of the second potential and the well biasing potential to the plurality of standard cells, and a trim-down signal generator for generating a trim-down signal that activates reduction of the second potential based on the temperature threshold signal and the power-down signal.

8. The power management system of claim 7, wherein the bandgap reference potential is provided to a positive terminal of the first amplifier, the second amplifier, the third amplifier, and the fourth amplifier.

9. The power management system of claim 7, wherein the first amplifier, the second amplifier, and the third amplifier are connected in a negative feedback configuration.

10. The power management system of claim 7, wherein the fourth potential is provided to a negative terminal of the fourth amplifier.

11. The power management system of claim 7, wherein the clock disable signal disables one or more clock signals received by the integrated circuit, and wherein the clock disable signal is generated external to the integrated circuit.

12. The power management system of claim 7, wherein the first power regulator is a high power regulator that provides power to the combinational logic block during a high power mode of the integrated circuit, wherein the high power mode is an operational mode of the integrated circuit, and wherein the first potential is a high power regulator potential.

13. The power management system of claim 7, wherein the second power regulator is a low power regulator that provides power to the memory block during the low power mode of the integrated circuit, and wherein the second potential is a low power regulator potential.

14. The power management system of claim 7, wherein the third power regulator is a low power regulator that provides power to the memory block during the low power mode of the integrated circuit.

15. The power management system of claim 7, wherein the power-down signal is generated by software.

16. The power management system of claim 15, wherein the software includes one or more predefined rules including one or more commands for disabling one or more clock signals received by the integrated circuit.

17. The power management system of claim 15, wherein the clock disable signal is generated by the software.

18. The power management system of claim 7, wherein the low power mode includes at least one of a stand-by mode and a stop mode.

* * * * *